United States Patent [19]

Debs et al.

[11] Patent Number: 6,108,743
[45] Date of Patent: Aug. 22, 2000

[54] TECHNIQUE FOR PERFORMING DMA INCLUDING ARBITRATION BETWEEN A CHAINED LOW PRIORITY DMA AND HIGH PRIORITY DMA OCCURRING BETWEEN TWO LINKS IN THE CHAINED LOW PRIORITY

[75] Inventors: Raymond E. Debs, Folsom, Calif.; John A. Carey, Winter Springs; Mitchell H. Singer, Oviedo, both of Fla.

[73] Assignees: Intel Corporation, Santa Clara, Calif.; Real 3D Inc., Orlando, Fla.

[21] Appl. No.: 09/021,688

[22] Filed: Feb. 10, 1998

[51] Int. Cl.⁷ .................................................. G06F 13/14
[52] U.S. Cl. ........................ 710/240; 710/22; 710/52; 710/240; 710/244
[58] Field of Search ........................ 710/22, 24, 52, 710/240, 244

[56] References Cited

U.S. PATENT DOCUMENTS

| | | | |
|---|---|---|---|
| 4,912,632 | 3/1990 | Gach et al. | 364/200 |
| 5,471,639 | 11/1995 | Harrington | 364/200 |
| 5,760,794 | 6/1998 | Munson et al. | 345/515 |
| 5,802,581 | 9/1998 | Nelsen | 711/151 |
| 5,857,114 | 1/1999 | Kim | 710/22 |

OTHER PUBLICATIONS

IBM Corporation—I/O Chain–Auto Poll Chain Timer for Work Station Controllers—Nov. 1990—Journal—pp. 251–253.

IBM Corporation—DMA Command Chaining to Support Bus Master Interleaved Memory and I/O Transfers On a Micro Channel—Jun.1991—Journal—pp. 236–237.

*Primary Examiner*—Thomas C. Lee
*Assistant Examiner*—Thuan Du
*Attorney, Agent, or Firm*—Blakely, Sokoloff, Taylor & Zafman LLP

[57] ABSTRACT

The invention, in one embodiment, is a method for performing direct memory access. The method includes arbitrating between a chained, low priority, direct memory access and a high priority, direct memory access, the arbitration occurring between two links in the chained, low priority, direct memory access.

14 Claims, 3 Drawing Sheets

TECHNIQUE FOR PERFORMING DMA INCLUDING ARBITRATION BETWEEN A CHAINED LOW PRIORITY DMA AND HIGH PRIORITY DMA OCCURRING BETWEEN TWO LINKS IN THE CHAINED LOW PRIORITY

BACKGROUND OF THE INVENTION

1. Field of the Invention

This invention pertains to direct memory access ("DMA") of data and, more particularly, to processing both low and high priority DMA commands.

2. Description of the Related Art

Programmed computers typically execute a series of instructions that require the manipulation of data stored in the computer's memory. Execution of instructions is usually performed by one or more processors that can retrieve data from the computer's memory in several ways. One way is to simply retrieve the necessary data whenever the processor executes an instruction. Although this technique is commonly used in some situations, it is extremely inefficient when large amounts of data must be quickly processed. For instance, to execute a program on a floppy disk, the computer must transfer the program from the floppy disk to some predetermined location in the computer's memory. It would be extremely cumbersome and time consuming for a processor to execute a new command to retrieve every necessary piece of data to accomplish this transfer. Thus, processors commonly use another technique known as "direct memory access," or "DMA" for data retrieval in these situations.

DMA, in the most generic form, is the transfer of a block of data with a single instruction although there are many variations on the theme. The processor may execute the DMA instruction or it may command a special circuit known as a "DMA controller" to execute the instruction. For instance, the processor might command the DMA controller to transfer a block of data by programming the destination, the first memory location, and the block length. The DMA controller will then transfer a block of data having the length specified and beginning at the first memory location to the specified destination. The destination may be an input/output ("I/O") port or another location in memory.

DMA operations are typically performed by a DMA engine embedded in a DMA controller. DMA engines and their DMA techniques are well known in the art. Exemplary DMA engines known to the art include the DMA engine in the core of the Intel® 8237 DMA controller or that in the core of the Intel® 960 chipset. However, not all DMA engines are embedded in DMA controllers. DMA engines may be flexibly employed depended on the particular design criteria under which DMA is being implemented.

In today's demanding computing environment, DMA is widely used in complex applications. Processors generally, or at least occasionally, issue DMA commands to DMA controllers more quickly than the DMA controllers can process them. This high demand for DMA consequently is usually handled by placing DMA commands from a processor in a buffer. The DMA controller then retrieves the commands from the buffer and processes them in the order the processor issues them. Thus, because the first command received is the first command processed, the buffers are called "first in, first out," or "FIFO," buffers.

DMA operations in such environments are usually categorized as "low priority" or "high priority." Low priority and high priority DMA operations usually have separate buffers denominated the "low priority FIFO," or "LPF," and the "high priority FIFO," or "HPF." High priority DMA operations require expedited processing whereas low priority DMA operations do not. Thus, although DMA commands in an individual FIFO are processed in the order they are received, DMA commands are not always processed in the order the processor issues them. Furthermore, problems can arise when a long, low priority DMA operation is performed.

These problems are readily apparent in a program operating a graphical user interface such as Microsoft Corporation's Windows® program. If the computer delays processing the high priority DMA operation until the low priority operations finishes, the user may experience unacceptable interactive response of the graphical user interface. Alternatively, long, low priority DMA operations may be broken into a series of smaller, low priority DMA operations. High priority DMA operations can then be conducted between the smaller low priority operations. However, this alternative incurs increased overhead in the generation of low priority commands and requires much more complex FIFO management techniques that can slow the program's operating speed. Thus, there is a need for a new DMA management technique.

The present invention is directed to overcoming, or at least reducing the effects of, one or more of the problems set forth above.

SUMMARY OF THE INVENTION

The invention, in one embodiment, is a method for performing direct memory access. The method includes arbitrating between a chained, low priority, direct memory access and a high priority, direct memory access, the arbitration occurring between two links in the chained, low priority, direct memory access.

BRIEF DESCRIPTION OF THE DRAWINGS

A more particular description of the invention briefly summarized above is set forth below by way of particular embodiments disclosed in the drawings of this specification and as described in connection therewith. The drawings nevertheless illustrate only typical, particular embodiments of the invention and are not to be considered limiting thereon as the invention may admit to other equally effective embodiments. In the drawings.

Figure 1:
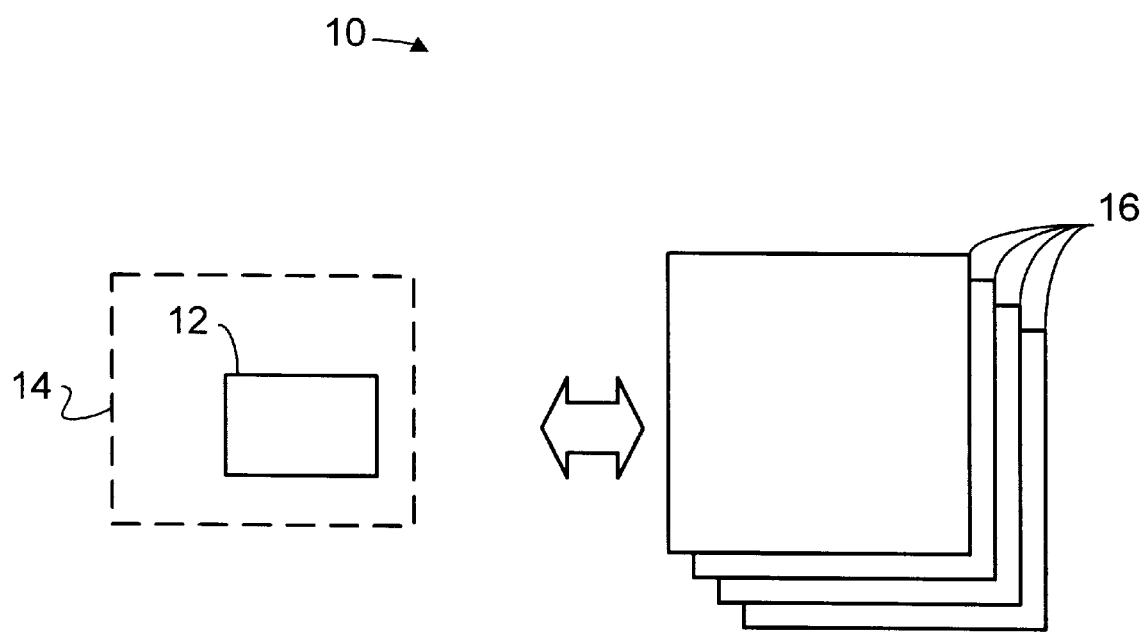
FIG. 1 conceptually depicts one embodiment of a memory subsystem of a computer in accord with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Numerous specific details are set forth below in the detailed description of particular embodiments to provide a thorough understanding of the present invention. However, one of ordinary skill in the art having the benefit of this disclosure will understand that the present invention may be practiced without many of the details presented since such details will be necessary or useful depending on the particular embodiment being employed. Conversely, in other instances, well known details have not been described for the sake of clarity so as not to obscure the invention. It will be appreciated that supplying such details would be a routine undertaking for those of ordinary skill in the art, even if a complex and time-consuming task, given the benefit of this disclosure.

Turning now to FIG. 1, the memory 10 includes a DMA engine 12 and one or more memory devices 16. The DMA engine 12 receives commands and data and transmits data over a bus (not shown) in accord with conventional practice as modified in accordance with the invention. The DMA engine 12 may, in some embodiments, be part of a DMA controller 14 shown in ghosted lines. The DMA engine 12, in response to commands, reads or writes data to or from, respectively, the memory devices 16.

The DMA engine 12 in the particular embodiment of FIG. 1 resides in the memory 10, although this is not necessary to the practice of the invention. As those in the art will appreciate, the operation and structure of the DMA engine 12 will, to some degree, depend on the type and organization of the memory devices 16, which will be implementation specific.

The memory devices 16 may be any type of random access memory ("RAM") known to the art. Exemplary memory types are the dynamic random access memories ("DRAM") such as, but not limited to, synchronous DRAM ("SDRAM"), fast page mode RAM ("FPM RAM"), extended data out DRAM ("EDO DRAM"), burst EDO DRAM ("BEDO DRAM"), video RAM ("VRAM"), Rambus DRAM ("RDRAM"), synchronous graphic RAM ("SGRAM"), SyncLink DRAM ("SLDRAM"), and window RAM ("WRAM").

The memory devices 16 may also be organized in any suitable fashion known to the art. The memory devices 16 may be banked in a simply interleaved or a complexly interleaved memory organization as are known in the art. However, to a large degree, the organization of the memory devices 16 will also be implementation specific.

Figure 2:
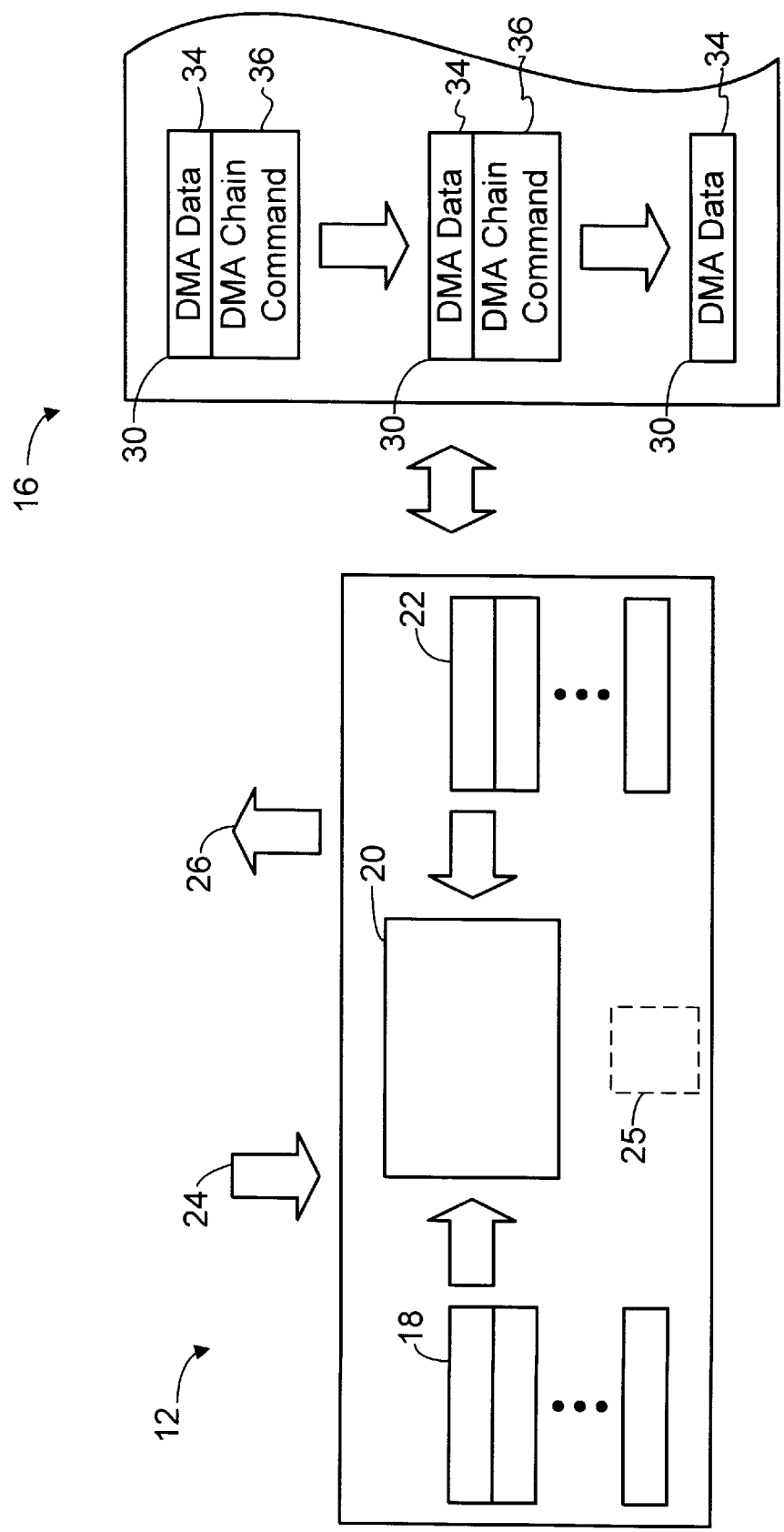
FIG. 2 depicts the DMA engine and memory devices of the memory subsystem in FIG. 1 in greater detail.

FIG. 2 illustrates the DMA engine 12 and one of the memory devices 16 of FIG. 1 in greater detail. The DMA engine 12 includes a low priority queue 18, an arbitrator 20, and a high priority queue 22. Both the low priority queue 18 and the high priority queue 22, in the particular embodiment illustrated, are first-in, first-out ("FIFO") queues and are designed and operated using queue construction techniques well known in the art. The arbitrator 20 is constructed and operates in accord with well known arbitration principles except as modified to practice the present invention.

The DMA engine 12 receives data and commands over a bus (not shown) as indicated by the arrows 24 and 26. Low priority DMA commands are queued in the queue 18 and high priority DMA commands are queued in the queue 22. Because the queues 18 and 22 are, in this particular embodiment, FIFO, the commands are processed in the order in which they are entered into the queues 18 and 22. When a low priority DMA command and a high priority DMA command need to be serviced at the same time, the arbitrator 20 then decides which command is serviced first. The arbitrator 20 awards the arbitration to either the low priority DMA command or the high priority DMA command. Whichever command wins the arbitration is then processed by the DMA engine 12.

Figure 3:
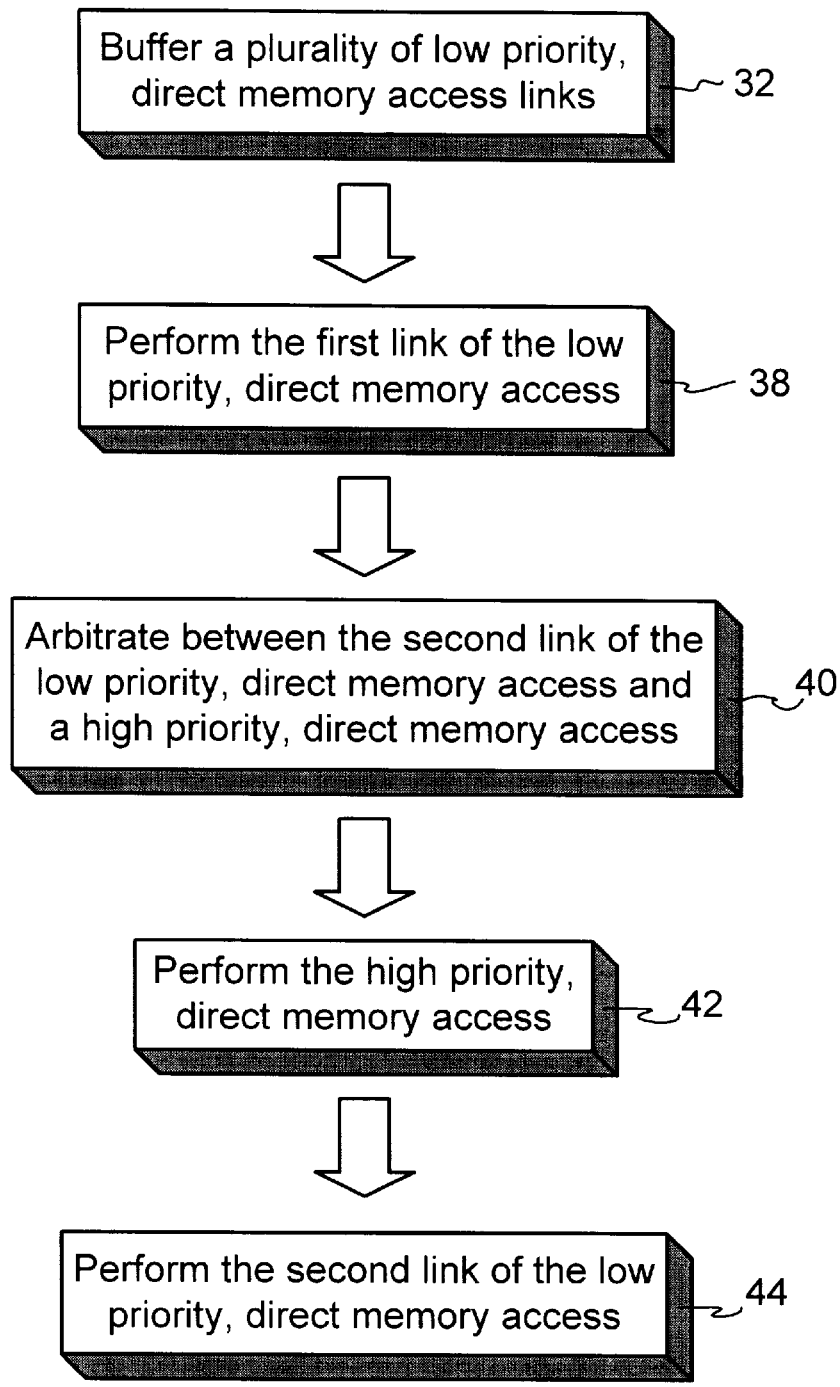
FIG. 3 illustrates one embodiment of a method for performing direct memory access in accord with the present invention.

Referring now to both FIGS. 2 and 3, the DMA engine 12 begins a low priority DMA operation by buffering a plurality of low priority DMA links 30 as set forth in block 32 of FIG. 3. The single low priority DMA command results in the buffered, chained links 30 instead of being broken into multiple low priority DMA commands or a single continuous DMA operation as is found in the prior art. There are three links 30 externally buffered in the memory device 16 in the embodiment illustrated in FIG. 2. However, the precise number of links 30 and whether they are buffered externally in the memory device 16 or internally to the DMA engine 12 is implementation specific and not material to the practice of the invention. Also, each link 30 is shown buffered in the single memory device 16 although, in some embodiments, they may be buffered in different memory devices 16 within the memory 10.

Each of the first two links 30 in the embodiment of FIG. 2 includes DMA data 34 and a chain command 36. The chain command 36 contains a pointer to the next link 30 in the chained low priority DMA command. The last link 30 does not include a chain command 36, although some alternative embodiments might employ a chain command of some type depending on the particular implementation. The presence of chain commands 36 in the links 30 provide the DMA engine 12 an opportunity to re-arbitrate during execution of the low priority DMA command.

Referring again to both FIGS. 2 and 3, the DMA engine 12 next performs the first link 30 of the low priority, direct memory access command as set forth in block 38. In the particular embodiment illustrated, this includes retrieving the link 30 from the external buffer in the memory 16 and parsing the link 30. For this purpose, the particular embodiment of the DMA engine 12 illustrated in FIG. 2 includes a command parser 25 shown in ghosted lines. The DMA engine 12 checks whether there is a need to re-arbitrate upon encountering the chain command 36. If so, arbitration commences. If not, the DMA engine 12 follows the chain command 36 to the next link 30 for execution.

The DMA engine 12 in the embodiment of FIG. 3 arbitrates between the low priority DMA command and a high priority DMA command between executing the first link 30 and the second link 30 as set forth in the block 40. The DMA engine 12 awards the arbitration to the high priority DMA command and the DMA engine 12 then performs the high priority DMA command as set forth in the block 42. Once the high priority DMA command is completed, the DMA engine 12 then returns to follow the chain command 36 and performs the second link 30 of the low priority DMA command as set forth in the block 44. In one particular embodiment, if more than one high priority DMA command has been queued, the DMA engine 12 performs all queued high priority DMA commands in the order in which they are queued before returning to follow the chain command 36.

The DMA engine 12 continues working its way down the chained low priority DMA command links 30, re-arbitrating and performing high priority DMA commands when possible. Each link 30 is, in its turn, retrieved from the external buffer in the memory 16, transferred to the DMA engine 12, parsed, and executed, with the high priority DMA commands executed in-between. The last link 30 omits any chain command. Thus, upon reaching the link 30 without any chain command 38, the DMA engine 12 knows the low priority DMA command has been completed and transfers all the data specified by the command over the bus (not shown) to the location specified by the command.

Thus, the present invention permits the execution of both low and high priority DMA operations without requiring undue delay for high priority operations even in the presence of long low priority operations. More particularly, the invention admits to a variety of implementations in which a single, queued, low priority DMA command can be executed in a manner that will permit the servicing of one or more high priority DMA commands as necessary or desirable. The invention may be flexibly applied to derive many variations on the embodiment illustrated that remain within the scope and spirit of the invention as claimed below. For instance, arbitration protocols may be designed to allow some low priority DMA commands to complete execution before servicing some high priority DMA commands.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for performing direct memory access comprising:
   separating a low priority direct memory access batch command into a plurality of links of a chain, in which a particular link is coupled to a subsequent link in the chain by a chain command;
   commencing execution of the low priority direct memory access batch command;
   arbitrating when a chain command is encountered if another direct memory access batch command of higher priority is pending;
   interrupting the continuing of the low priority direct memory access batch command until the higher priority batch command is serviced;
   using the chain command of a last executed link to identify location of a next link in the chain;
   continuing with the execution of the low priority direct memory access batch command for the next link in the chain.

2. The method of claim 1 in which the links and the chain commands are stored in a buffer.

3. The method of claim 1 wherein the chain commands use a pointer to point to respective next links in the chain.

4. The method of claim 3 wherein data for a given link and its respective chain command are stored together in a buffer.

5. The method of claim 1 wherein low priority batch commands are stored in a first first-in, first-out queue and higher priority batch commands are stored in a second first-in, first-out queue.

6. A method comprising:
   separating a low priority direct memory access command into a plurality of links of a chain, in which a particular link is coupled to a subsequent link in the chain by a chain command;
   beginning the low priority direct memory access command;
   halting the low priority direct memory access command at a predetermined point where one of the chain commands is encountered;
   arbitrating between continuing the low priority direct memory access command and servicing a high priority direct memory access command, if the high priority direct memory access command is pending;
   servicing the high priority direct access memory command; and
   resuming the low priority direct memory access command by using the chain command at point of interruption to locate a next link in the chain.

7. The method of claim 6 further comprising awarding an arbitration to the low priority direct memory access command before beginning the low priority direct memory access command.

8. The method of claim 6 in which the links and the chain commands are stored in a buffer.

9. The method of claim 6 wherein the chain commands use a pointer to point to respective next links in the chain.

10. The method of claim 6 wherein low priority direct memory access commands are stored in a first first-in, first-out queue and high priority direct memory access commands are stored in a second first-in, first-out queue, in which arbitration is performed between entries in the two queues.

11. An apparatus comprising:
    a first queue to store a low priority direct memory access command;
    a second queue to store a high priority direct memory access command;
    a buffer to store a plurality of links associated with a separation of the low priority direct memory access command into multiple links forming a chain, the links coupled to respective subsequent links in the chain by respective chain commands;
    an arbitrator coupled to the queues and the buffer to arbitrate between the low and high priority commands, the arbitrator performing arbitration at end of each link to suspend the low priority direct memory access if the high priority command is pending, and resuming low priority direct memory access by using a chain command of the suspended link to point to a subsequent link in the chain.

12. The apparatus of claim 11 wherein the arbitrator and the queues are included as part of a direct memory controller.

13. The apparatus of claim 11 wherein the buffer is external to the direct memory controller.

14. The apparatus of claim 11, wherein the direct memory access engine further includes a command parser to parse the links from the buffer.

* * * * *